United States Patent
Okamoto

(10) Patent No.: US 12,265,042 B2
(45) Date of Patent: Apr. 1, 2025

(54) X-RAY FLUORESCENCE ANALYZER

(71) Applicant: Shimadzu Corporation, Kyoto (JP)

(72) Inventor: Yasuyuki Okamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 187 days.

(21) Appl. No.: 18/036,552

(22) PCT Filed: Jun. 9, 2021

(86) PCT No.: PCT/JP2021/021853
§ 371 (c)(1),
(2) Date: May 11, 2023

(87) PCT Pub. No.: WO2022/102153
PCT Pub. Date: May 19, 2022

(65) Prior Publication Data
US 2023/0408428 A1    Dec. 21, 2023

(30) Foreign Application Priority Data
Nov. 12, 2020 (JP) .................... 2020-188416

(51) Int. Cl.
  *G01N 23/223* (2006.01)
  *G01N 23/2204* (2018.01)
(52) U.S. Cl.
  CPC ....... *G01N 23/223* (2013.01); *G01N 23/2204* (2013.01); *G01N 2223/076* (2013.01); *G01N 2223/309* (2013.01)
(58) Field of Classification Search
  CPC ............. G01N 23/223; G01N 23/2204; G01N 2223/076; G01N 2223/309
  See application file for complete search history.

(56) References Cited

U.S. PATENT DOCUMENTS 6,324,251 B1   11/2001  Kuwabara
7,634,053 B2 * 12/2009  Matoba ................ G01N 23/223
                                                    378/47
2018/0031497 A1  2/2018  Parks et al.

FOREIGN PATENT DOCUMENTS

JP   2000-193615 A   7/2000
JP   2020-085826 A   6/2020

OTHER PUBLICATIONS

JP 3270829 B2 and its machine English translation (Year: 2002).*
(Continued)

*Primary Examiner* — Chih-Cheng Kao
(74) *Attorney, Agent, or Firm* — Muir Patent Law, PLLC

(57) ABSTRACT

An X-ray fluorescence analyzer includes a sample stage having an opening, the sample stage being configured to place a sample thereon so that the sample is exposed from the opening, an X-ray source for irradiating the sample with primary X-rays from below the sample stage through the opening, and a detector for detecting fluorescence X-rays generated from the sample. It further includes an analyzer for analyzing the constituent elements based on the fluorescence X-rays, a measuring device for measuring a height of a surface of the sample exposed from the opening, a determination unit for determining whether a height difference between the height measured by the measuring device and a height of the upper surface of the sample stage is within a tolerance, and a notification unit for notifying a determination result of the determination unit. With this, the reliability of the analysis result can be recognized.

6 Claims, 7 Drawing Sheets

(56) References Cited

OTHER PUBLICATIONS

Office Action dated Jan. 12, 2024 for corresponding Indian patent application No. 202347038823.
PCT Written Opinion of the International Searching Authority (Form PCT/ISA/237) for PCT application No. PCT/JP2021/021853 dated Aug. 31, 2021.

* cited by examiner

X-RAY FLUORESCENCE ANALYZER

TECHNICAL FIELD

The present invention relates to an X-ray fluorescence analyzer.

BACKGROUND ART

Conventionally, there is known an X-ray fluorescence analyzer that analyzes constituent elements of a sample by irradiating the sample with X-rays and detecting the X-ray fluorescence emitted from the sample. For example, Japanese Unexamined Patent Application Publication No. 2020-085826 (Patent Document 1) discloses an X-ray fluorescence analyzer having the following configurations (1) to (3).
  (1) a sample stage having an opening, the sample stage being configured to place a sample thereon to be exposed from the opening,
  (2) an X-ray source for irradiating the sample with X-rays through the opening, and
  (3) a detector for detecting the X-ray fluorescence generated from the sample.

PRIOR ART DOCUMENT

Patent Document

Patent Document 1: Japanese Unexamined Patent Application Publication No. 2020-085826

SUMMARY OF THE INVENTION

Problems to be Solved by the Invention

In the X-ray fluorescence analyzer disclosed in Patent Document 1, the intensity of the fluorescence X-rays incident on the detector from the sample may vary depending on the state of the sample placement on the sample stage. Therefore, the reliability of the analysis result by the X-ray fluorescence analyzer also varies depending on the state of the sample placement on the sample stage. For example, even if the sample contains only a small amount of regulated substances subject to the RoHS (Restriction of Hazardous Substances) directive, the regulated substances may not be detected. However, the analyst is unable to recognize the decrease in the reliability of the analysis result due to the sample placement status.

The present disclosure has been made to solve the above-described problem, and an object thereof is to provide an X-ray fluorescence analyzer capable of recognizing the reliability of the analysis result.

Means for Solving the Problems

An X-ray fluorescence analyzer according to one aspect of the present invention is configured to analyze the constituent elements of a sample. The X-ray fluorescence analyzer includes a sample stage having an opening, the sample stage being configured to place a sample thereon so that the sample is exposed from the opening, an X-ray source configured to irradiate the sample with primary X-rays from below the sample stage through the opening, and a detector configured to detect fluorescence X-rays generated from the sample. Further, the X-ray fluorescence analyzer further includes an analyzer configured to analyze the constituent elements based on the fluorescence X-rays, a measuring device configured to measure a height of a surface of the sample exposed from the opening, a determination unit configured to determine whether a height difference between the height measured by the measuring device and a height of an upper surface of the sample stage is within a tolerance, and a notification unit configured to notify a determination result of the determination unit.

Effects of the Invention

According to the present invention, it is possible to provide an X-ray fluorescence analyzer capable of recognizing the reliability of the analysis result.

EMBODIMENTS FOR CARRYING OUT THE INVENTION

Figure 1:
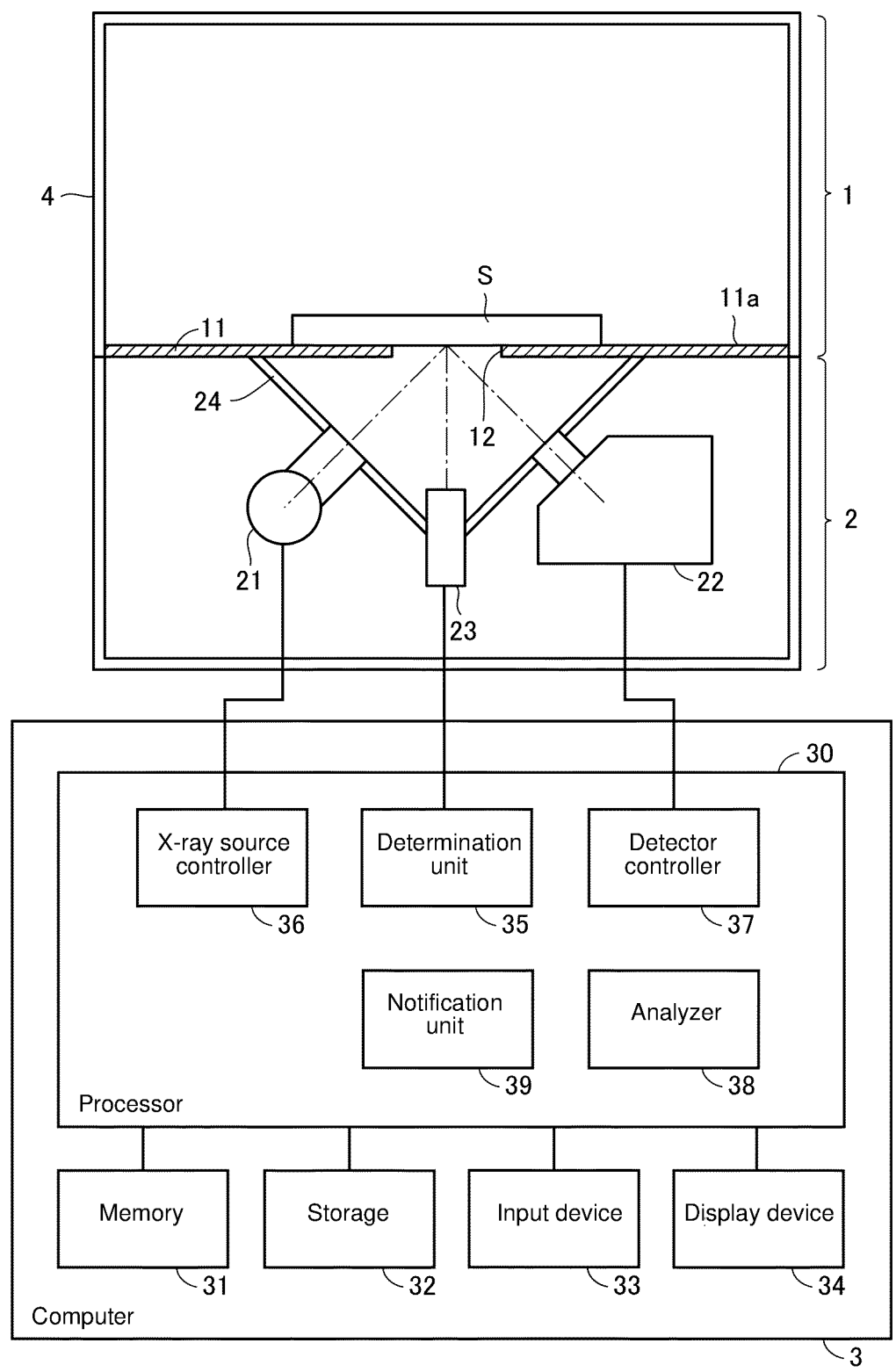
FIG. 1 is a diagram schematically showing an entire configuration of an X-ray fluorescence analyzer according to Embodiment 1.

Hereinafter, some embodiments of the present invention will be described below with reference to the attached drawings. Note that in the following description, the same or corresponding part in the drawings is assigned by the same reference numeral, and the description thereof will not be repeated in principle.

Embodiment 1

<Overall Configuration of X-Ray Fluorescence Analyzer>
FIG. 1 is a diagram schematically showing an entire configuration of an X-ray fluorescence analyzer according to Embodiment 1 of the present disclosure. The X-ray fluorescence analyzer 100 analyzes constituent elements of a sample S. The X-ray fluorescence analyzer 100 is, for example, an energy dispersive X-ray fluorescence analyzer.

As shown in FIG. 1, the X-ray fluorescence analyzer 100 is provided with a sample chamber 1, a measurement chamber 2, and a computer 3. The sample chamber 1 and the measurement chamber 2 are hermetically enclosed by a housing 4 to keep the internal space evacuated as needed. The housing 4 has, for example, a rectangular parallelepiped shape.

The sample chamber 1 includes a sample stage 11 at the bottom. An opening 12 is formed in the sample stage 11. A sample S is placed on the upper surface 11a of the sample stage 11 such that at least a part of the sample is exposed from the opening 12. The sample S may be in a solid form, a powder form, or a liquid form. However, in a case where the sample S is in a powder form or a liquid form, the sample S is placed in a sample cup.

The measurement chamber 2 includes an X-ray source 21, a detector 22, a measuring device 23, and a support member 24. The X-ray source 21 is installed below the sample stage 11. The X-ray source 21 irradiates the sample S with primary X-rays from below the sample stage 11 through the opening 12. The X-ray source 21 includes a filament that emits thermal electrons and a target that converts the thermal electrons into predetermined primary X-rays and emits them. The X-ray source 21 is installed such that the center of the beam of the primary X-rays coincides with the center of the opening 12.

The detector 22 is installed below the sample stage 11 and receives the X-ray fluorescence (secondary X-rays) generated from the sample S through the opening 12 to detect the energy and the intensity of the X-ray fluorescence.

The X-ray source 21 and the detector 22 are installed such that the intensity of the fluorescence X-rays detected by the detector 22 is maximized when the height of the surface Sa of the sample S exposed from the opening 12 in the vertical direction (the Z-axis in the drawing) coincides with the height of the upper surface 11a of the sample stage 11.

Between the X-ray source 21 and the opening 12, a filter that attenuates the background components of the primary X-rays emitted from the X-ray source 21 to improve the S/N ratio of the required characteristic X-rays may be installed. Alternatively, a collimator may be provided between the X-ray source 21 and the opening 12 to determine the size of the primary X-ray beam emitted to the sample S.

The measuring device 23 measures the height of the surface Sa of the sample S exposed from the opening 12 with respect to the reference horizontal plane. In Embodiment 1, the measuring device 23 is a laser range finder.

Figure 2:
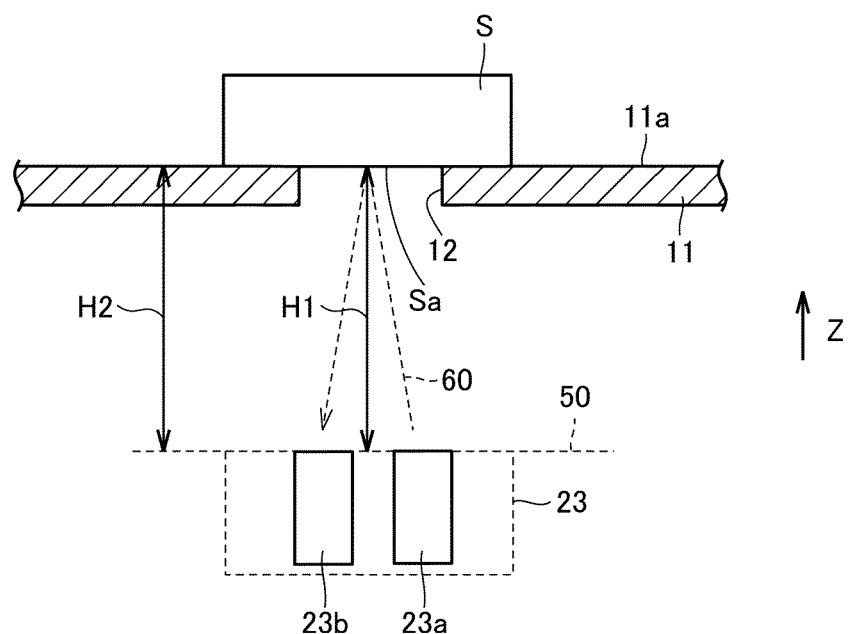
FIG. 2 is a diagram showing one example of an inner configuration of a measuring device according to Embodiment 1.

FIG. 2 is a diagram showing one example of the inner configuration of the measuring device 23 according to Embodiment 1. As shown in FIG. 2, the measuring device 23 is provided with a light-emitter 23a and a light-receiver 23b. The light-emitter 23a emits the laser beam 60 toward the center of the opening 12. The light-receiver 23b receives the laser beam 60 reflected by the surface Sa of the sample S. The measuring device 23 measures the height H1 of the surface Sa of the sample S exposed from the opening 12 by using a known method, such as, e.g., a phase difference detecting method, a triangulation method, or a TOF (Time of Flight method). The height H1 of the surface Sa is represented by the distance between the reference horizontal plane 50 and the surface Sa along the vertical direction (the Z-axis in the drawing). The reference horizontal plane 50 is, for example, a horizontal plane including a point at which light is emitted from the light-emitter 23a.

As shown in FIG. 1, the support member 24 supports the X-ray source 21, the detector 22, and the measuring device 23. With this, the relative position of the X-ray source 21, the detector 22, and the measuring device 23 with respect to the opening 12 is fixed.

The computer 3 includes a processor 30, a memory 31, a storage 32, an input device 33, and a display device 34.

The processor 30 is configured by, for example, a CPU (Central Processing Unit), an MPU (Micro Processing Unit), and the like. The processor 30 reads out various programs stored in the storage 32, expands them on the memory 31, and executes them. The memory 31 is configured by a volatile storage device, such as, e.g., a DRAM (Dynamic Random Access Memory) and an SRAM (Static Random Access Memory). The storage 32 is configured by a non-volatile storage device, such as, e.g., an SSD (Solid State Drive) and an HDD (Hard Disk Drive).

The input device 33 includes, for example, a keyboard, a mouse, a touch panel, and the like. The display device 34 is, for example, a liquid crystal display.

As shown in FIG. 1, the processor 30 executes programs to realize the determination unit 35, the X-ray source controller 36, the detector controller 37, the analyzer 38, and the notification unit 39.

The determination unit 35 determines whether the height difference $\Delta H$ (=H1−H2) between the height H1 measured by the measuring device 23 and the height H2 (see FIG. 2) of the upper surface 11a of the sample stage 11 is within a tolerance. Depending on the installed position of the measuring device 23, the height H2 of the upper surface 11a with respect to the reference horizontal plane 50 is predetermined. Therefore, the determination unit 35 may store the predetermined height H2 and calculate the height difference $\Delta H$. The tolerance of the height difference $\Delta H$ is determined in advance so that an erroneous analysis result is not output due to the variation of the height difference $\Delta H$. The tolerance of the height difference $\Delta H$ is, for example, −0.2 mm to +0.2 mm.

The X-ray source controller 36 causes the X-ray source 21 to emit primary X-rays in response to an input of an analysis start instruction to the input device 33.

The detector controller 37 acquires the fluorescence spectrum from the detector 22 in response to the emission of the primary X-rays from the X-ray source 21. The fluorescence spectrum indicates the intensity of the fluorescence X-rays per energy.

The analyzer 38 analyzes the constituent elements of the sample S based on the fluorescence spectrum. Specifically, the analyzer 38 performs a qualitative analysis and a quantitative analysis of the constituent elements. The analyzer 38 outputs the analysis results. For example, the analyzer 38 generates data indicating the analysis results and stores the generated data in the specified folders. Alternatively, the analyzer 38 displays the analysis results on the display device 34.

The notification unit 39 notifies the determination result of the determination unit 35. Specifically, the notification unit 39 displays a warning indicating that the position of the sample S is not appropriate on the display device 34 in response to the determination that the height difference $\Delta H$ is out of the tolerance before the analysis start instruction is input to the input device 33. With this, the analyst can recognize that the reliability of the analysis result is degraded when the analysis is started under the current condition by confirming the warning displayed on the display device 34. Therefore, the analyst can change the position of the sample S to avoid the degradation of the reliability. The warning may include a message prompting the user to change the position of the sample S.

Further, the notification unit 39 adds the information indicating that the height difference $\Delta H$ is outside the tolerance to the analysis result in response to the analysis of the constituent elements by the analyzer 38 based on the fluorescence spectrum detected in a state in which the height $\Delta H$ is outside the tolerance. This allows the analyst to recognize that the analysis result was made under improper conditions and the analysis result is unreliable by confirming the information added to the analysis result.

<Processing Flow of X-Ray Fluorescence Analyzer>

Figure 3:
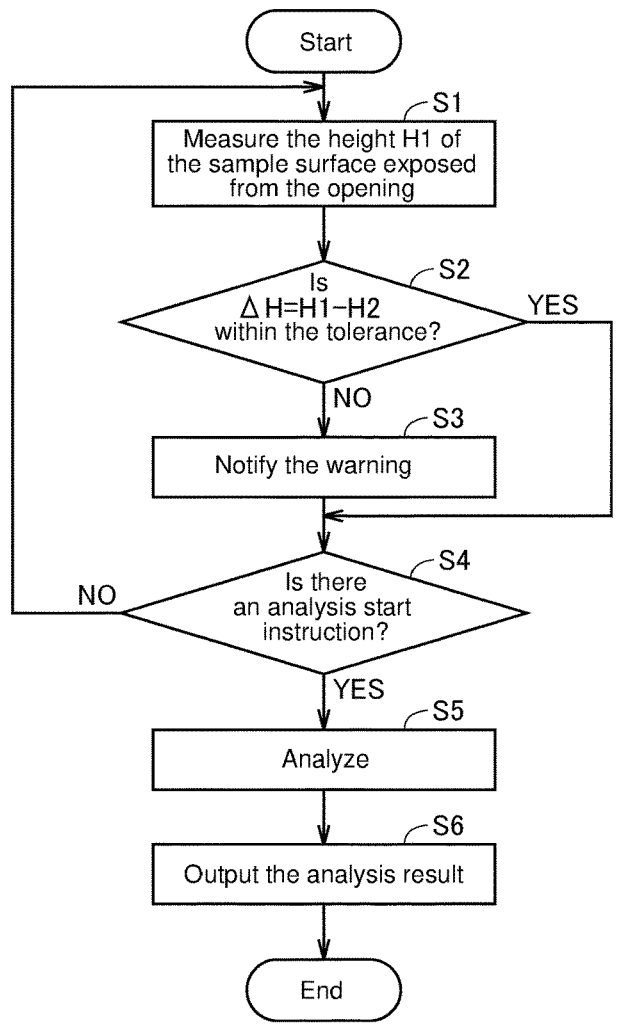
FIG. 3 is a flowchart showing one example of a processing flow of an X-ray fluorescence analyzer according to Embodiment 1.

FIG. 3 is a flowchart showing one example showing the processing of the X-ray fluorescence analyzer according to Embodiment 1.

As shown in FIG. 3, the measuring device 23 measures the height H1 of the surface Sa of the sample S exposed from the opening 12 (Step S1).

The processor 30 calculates the height difference ΔH (=H1−H2) between the height H1 and the height H2 of the upper surface 11a of the sample stage 11 and determines whether the height difference ΔH is within a predetermined tolerance (Step S2).

When the height difference ΔH is outside the tolerance (NO in Step S2), the processor 30 notifies the warning indicating that the position of the sample S is not appropriate (Step S3).

Figure 4:
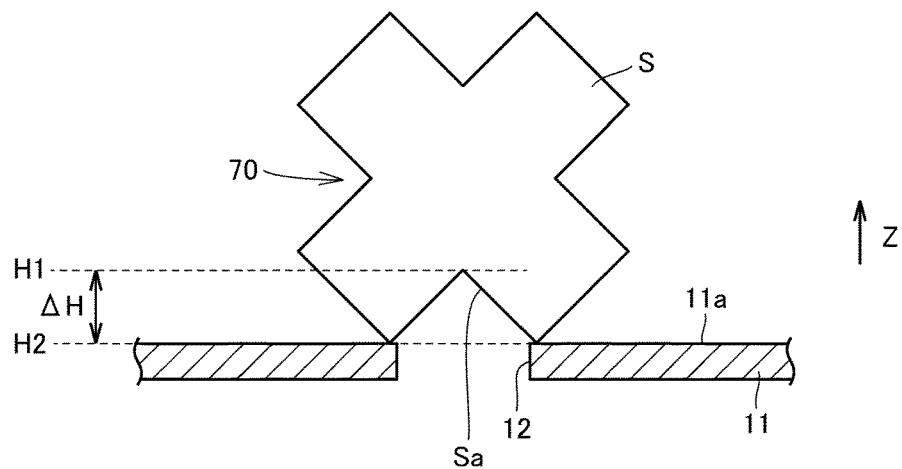
FIG. 4 is a diagram showing one example of a positional relation between a sample and an opening when it is determined that a height difference is outside a tolerance.

FIG. 4 is a diagram showing one example of the relative positional relation between the sample and the opening when it is determined that the height difference ΔH is outside the tolerance. A plurality of recesses 70 is formed on the surface of the sample S shown in FIG. 4. Therefore, as shown in FIG. 4, when the sample S is placed on the sample stage 11 such that one of the plurality of recesses 70 covers the opening 12, the height difference ΔH between the height H1 of the surface Sa of the sample S exposed from the opening 12 and the height H2 of the upper surface 11a of the sample stage 11 becomes outside the tolerance. In such a case, a warning is notified. With this, the analyst can recognize that the reliability of the analysis result deteriorates when the analysis is started under the present condition, and performs the position adjustment of the sample S. For example, the analyst may reload the sample S on the sample stage 11 so that none of the plurality of recesses 70 covers the opening 12.

As shown in FIG. 3, in a case where the height difference ΔH is within the tolerance (YES in Step S2), or after Step S3, the processor 30 determines whether an analysis start instruction has been input to the input device 33 (Step S4). If no analysis start instruction has been input (NO in Step S4), the X-ray fluorescence analyzer 100 returns the processing to Step S1.

When an analysis start instruction is input (YES in Step S4), the processor 30 causes the X-ray source 21 to emit primary X-rays and acquires the fluorescence spectrum from the detector 22. Then, the processor 30 analyzes the constituent elements of the sample S based on the fluorescence spectrum (Step S5).

Next, the processor 30 outputs the analysis result (Step S6). When Step S5 is executed in a state in which the height difference ΔH is outside the tolerance, the processor 30 adds the information indicating that the height difference ΔH is outside the tolerance to the analysis result. This allows the analyst to recognize that the analysis result was obtained under improper conditions and that the analysis result is low in reliability.

<Modifications>

In the above-described discussion, the measuring device 23 is a laser range finder. However, the measuring device 23 is not limited to a laser range finder and may be any device that can measure the height H1 of the surface Sa of the sample S exposed from the opening 12. For example, the measuring device 23 may be a device that performs a three-dimensional image measurement.

Figure 5:
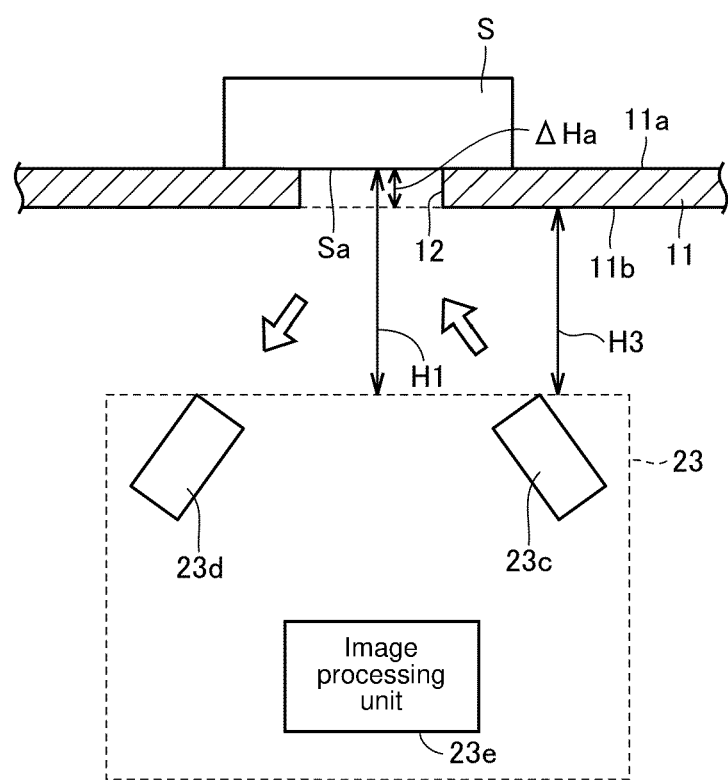
FIG. 5 is a diagram showing a configuration of a measuring device according to a modification.

FIG. 5 is a diagram showing a configuration of a measuring device according to a modification. As shown in FIG. 5, the measuring device 23 is provided with an illumination unit 23c, at least one imaging unit 23d, and an image processing unit 23e.

The illumination unit 23c emits illumination light from below the sample stage 11 toward the opening 12. At least one imaging unit 23d is positioned such that the opening 12 and its surround are included in the field of view and images the opening 12 from below.

The image processing unit 23e generates a three-dimensional image obtained from the image of at least one imaging unit 23d and uses the generated three-dimensional image to calculate the height H1 of the surface Sa of the sample S exposed from the opening 12.

The image processing unit 23e may generate a three-dimensional image using a known method. As a method of a three-dimensional image measurement, a stereo method, an active stereo method, and the like are known. The stereo method is a method using the principle of triangulation to generate a three-dimensional image from images of two cameras arranged side by side. When using the stereo method, the measuring device 23 includes a plurality of imaging units 23d. The active stereo method is a method using the principle of triangulation in the same way as the stereo method, but it generates a three-dimensional image from an image when the patterned beam is emitted. In the active stereo method, one camera and one projector are required. Therefore, in the case of using the active stereo method, the measuring device 23 may include one imaging unit 23d.

As described above, the field of view of at least one imaging unit 23d includes the periphery of the opening 12. That is, the captured image reflects the lower surface 11b of the sample stage 11. The height H3 of the lower surface 11b of the sample stage 11 with respect to the measuring device 23 is known. Therefore, the image processing unit 23e calculates the height difference ΔHa (=H1-H3) between the portion reflecting the lower surface 11b and the portion reflecting the surface Sa of the sample S exposed from the opening 12, using a three-dimensional image. The image processing unit 23e may calculate the height H1 by storing the known height H3 in advance and substituting H3 and ΔHa into the equation H1=H3+ΔHa.

Note that the image processing unit 23e may be realized by the processor 30 of the computer 3. In this case, the processor 30 constitutes a part of the measuring device 23. That is, the processor 30 acquires an image from at least one imaging unit 23d and generates a three-dimensional image from the acquired image. The processor 30 uses the three-dimensional image to calculate the height H1 of the surface Sa of the sample S exposed from the opening 12.

Embodiment 2

<Overall Configuration of X-Ray Fluorescence Analyzer>

Figure 6:
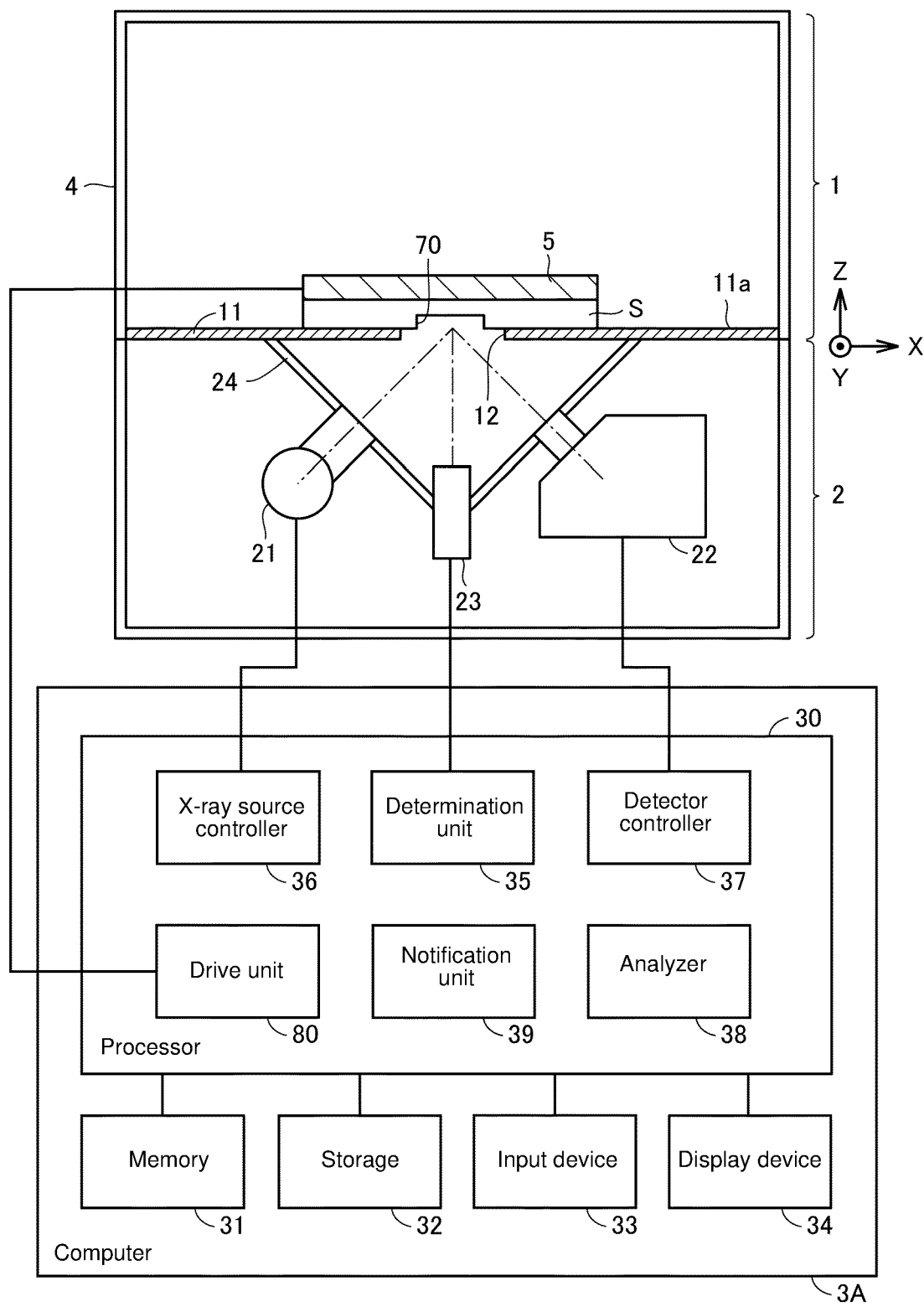
FIG. 6 is a diagram schematically showing an entire configuration of an X-ray fluorescence analyzer according to Embodiment 2.

FIG. 6 is a diagram schematically showing an entire configuration of an X-ray fluorescence analyzer according to Embodiment 2 of the present disclosure. The X-ray fluorescence analyzer 100A differs from the X-ray fluorescence analyzer 100 according to Embodiment 1 in that it is provided with a computer 3A instead of the computer 3 and is further provided with a moving mechanism 5.

The moving mechanism 5 is an XY stage configured to move along the upper surface 11a of the sample stage 11. The sample S is attached to the moving mechanism 5. Therefore, the moving mechanism 5 can move the sample S along the upper surface 11a of the sample stage 11.

The computer 3A includes a processor 30, a memory 31, a storage 32, an input device 33, and a display device 34, like the computer 3 according to Embodiment 1. When the processor 30 executes programs stored in the storage 32, the determination unit 35, the X-ray source controller 36, the detector controller 37, the analyzer 38, and the notification unit 39 are realized, and the drive unit 80 is further realized.

The drive unit 80 controls the movement of the moving mechanism 5. Specifically, the drive unit 80 controls the movement of the moving mechanism 5 by controlling the operation of the motor (not shown) included in the moving mechanism 5.

In response to the determination by the determination unit 35 that the height difference ΔH is outside the tolerance, the drive unit 80 moves the moving mechanism 5 in a predetermined direction by a predetermined movement amount. For example, the drive unit 80 moves the moving mechanism in the X-axis direction by a movement amount ΔX. Alternatively, the drive unit 80 moves the moving mechanism in the Y-axis direction by a movement amount ΔY With this, as shown in FIG. 6, even in a case where the sample S is placed on the upper surface 11a of the sample stage 11 so that the recess 70 covers the opening 12, the moving mechanism 5 moves, so that the sample S moves to the position where the recess 70 does not cover the opening 12. Consequently, it is possible to suppress the decrease in the reliability of the analysis result.

<Processing Flow of X-Ray Fluorescence Analyzer>

Figure 7:
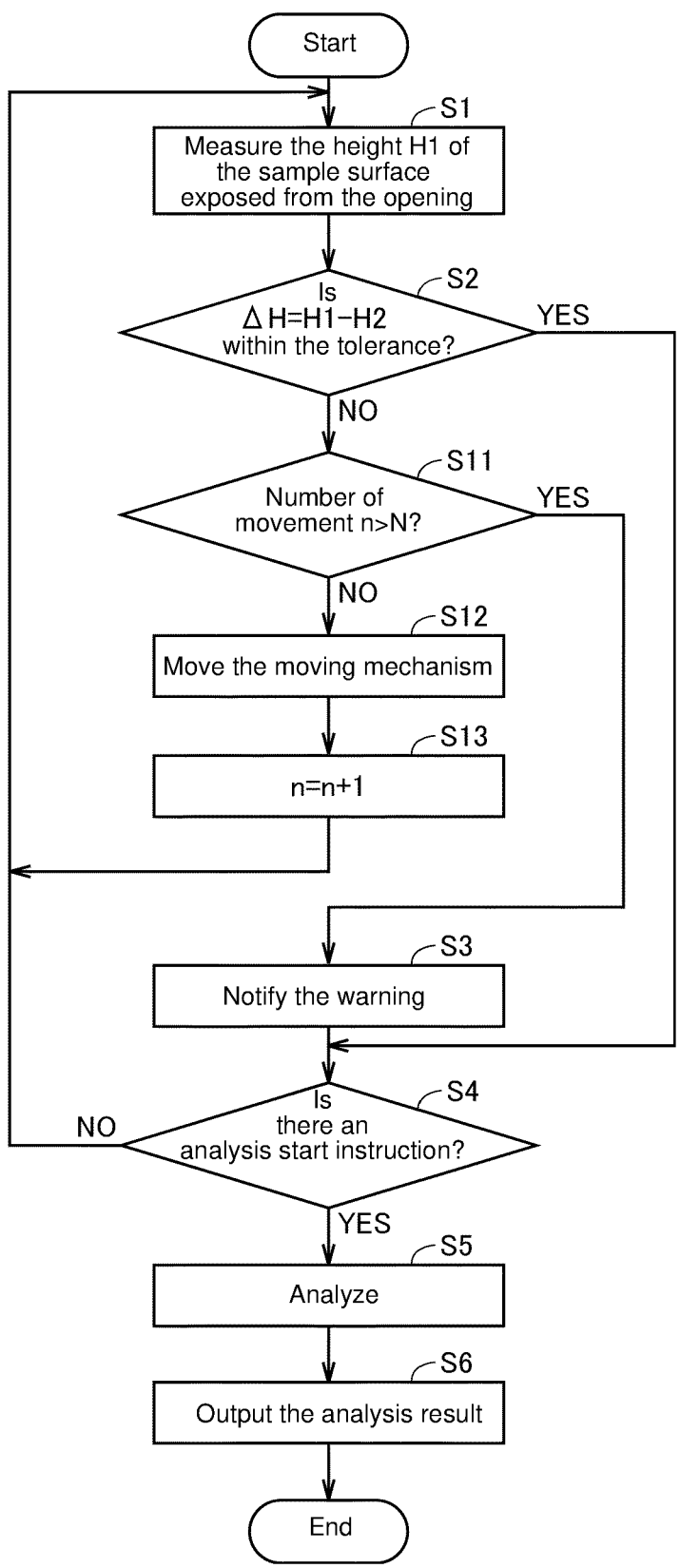
FIG. 7 is a flowchart showing one example of a processing flow of an X-ray fluorescence analyzer according to Embodiment 2.

FIG. 7 is a flowchart showing one example of the processing flow of the X-ray fluorescence analyzer according to Embodiment 2.

The flowchart shown in FIG. 7 differs from the flowchart shown in FIG. 3 in that it contains Steps S11 to S13 when it is NO in Step S2. Therefore, Steps S11 to S13 will be described, and the description of the other Steps will be omitted.

In a case where the height difference ΔH is outside the tolerance (NO in Step S2), the processor 30 determines whether the number of movements n from the beginning of the processing has exceeded a predetermined value N (Step S11). N is, for example, 10. The number of movements n is reset to 0 (zero) at the beginning of the flow shown in FIG. 7.

When the number of movements n has not exceeded N (NO in Step S11), the processor 30 moves the moving mechanism 5 in a predetermined direction by a predetermined movement amount (Step S12). For example, the processor 30 may move the moving mechanism 5 in the X-axis direction by a movement amount ΔX. Alternatively, the processor 30 may move the moving mechanism 5 in the Y-axis direction by a movement amount ΔY Alternatively, the processor 30 may move the moving mechanism 5 in the X-axis direction by a movement amount ΔX when n is an odd number, and may move the moving mechanism 5 in the Y-axis direction by a movement amount ΔY when n is an even number.

After Step S12, the processor 30 increments the number of movements n by one. After Step S13, the X-ray fluorescence analyzer 100A returns the processing to Step S1.

When the number of movements n has not exceeded N (NO in Step S11), the processor 30 executes the processing of Step S3.

According to the X-ray fluorescence analyzer 100A according to Embodiment 2, when the height difference ΔH is outside the tolerance, the moving mechanism 5 moves the sample S. Therefore, the height difference ΔH may automatically become within the tolerance. Consequently, it is possible to omit the time and labor for the analyst to adjust the position of the sample S.

However, depending on the sample S, the height difference ΔH may not become within the tolerance even if it is moved N times. Only in such a case, the X-ray fluorescence analyzer 100A will notify the warning that the position of the sample S is not appropriate. Therefore, the frequency of notifying the warning is reduced as compared with Embodiment 1. This also reduces the frequency that the analyst performs the position adjustment of the sample S in response to the warning.

<Modifications>

In the above-described description, the moving mechanism 5 is assumed to be in the XY stage. However, the moving mechanism 5 is not limited to the XY stage and may be any mechanism that moves the sample S along the upper surface 11a of the sample stage 11.

Figure 8:
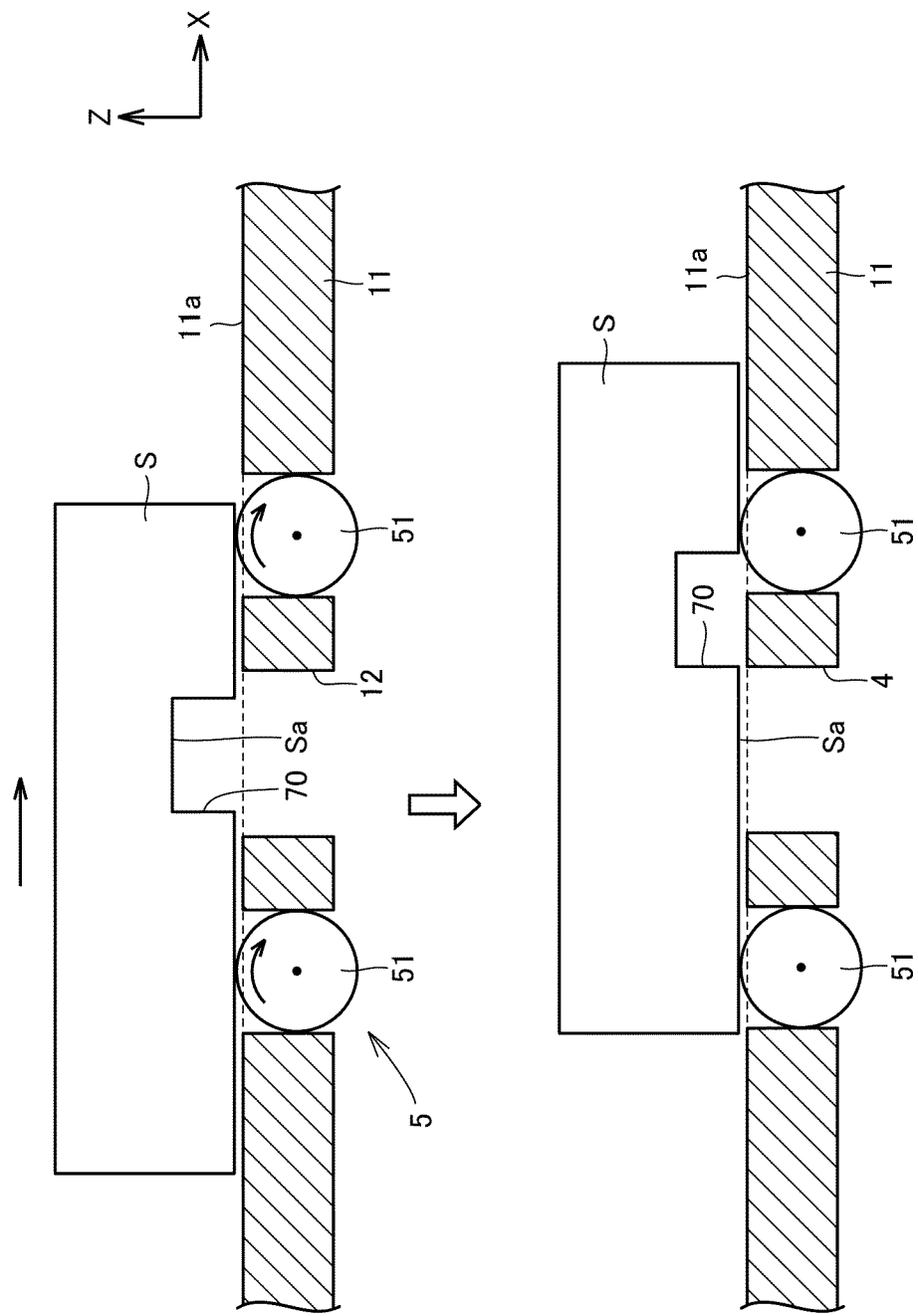
FIG. 8 is a diagram showing a configuration of a moving mechanism according to a modification.

FIG. 8 is a diagram showing a configuration of a moving mechanism according to a modification. As shown in FIG. 8, the moving mechanism 5 includes a plurality of rollers 51 embedded in the sample stage 11. The plurality of rollers 51 is arranged around the opening 12. A part of the roller 51 protrudes from the upper surface 11a of the sample stage 11. Therefore, the sample S placed on the sample stage 11 contacts the roller 51 and moves in response to the rotation of the roller 51. The roller 51 illustrated in FIG. 8 has a rotation axis along the Y-axis. Therefore, the sample S moves in the X-axis direction in response to the rotation of the roller 51.

The rotation axes of the plurality of rollers 51 are attached to the sample stage 11 such that the height difference between the upper end of the roller 51 and the upper surface 11a of the sample stage 11 is within the tolerance.

As shown in FIG. 8, even if the sample S is placed on the sample stage 11 so that the recess 70 covers the opening 12, when the roller 51 rotates, the sample S is automatically moved to a position where the recess 70 does not cover the opening 12. Consequently, the height difference ΔH becomes within the tolerance, and the time and labor for the analyst to adjust the position of the sample S can be omitted.

Note that the rotation axes of the plurality of rollers 51 may be movable in the up-down direction (Z-axis direction). The drive unit 80 moves the rotation axis in the upward direction so that a part of each roller 51 protrudes upward from the upper surface 11a of the sample stage 11 immediately before rotating the plurality of rollers 51. With this, the sample S comes into contact with the plurality of rollers 51 and moves in response to the rotations of the plurality of rollers 51. After completing the rotational driving of the plurality of rollers 51, the drive unit 80 moves the rotation axis in the downward direction so that the upper end of each roller 51 becomes equal to or lower than the height of the upper surface 11a of the sample stage 11. With this, the sample S comes into contact with the upper surface 11a of the sample stage 11. Consequently, the height difference ΔH can be brought close to 0.

ASPECTS

It will be appreciated by those skilled in the art that the above-described plurality of exemplary embodiments and their modification are illustrative of the following aspects.

(Item 1)

An X-ray fluorescence analyzer 100, 100A according to one aspect of the present invention is configured to analyze constituent elements of a sample. The X-ray fluorescence analyzer includes a sample stage 11 having an opening 12, the sample stage 11 being configured to place a sample S thereon so that the sample S is exposed from the opening 12, an X-ray source 21 configured to irradiate the sample with primary X-rays from below the sample stage through the opening, and a detector 22 configured to detect fluorescence X-rays generated from the sample. The X-ray fluorescence analyzer further includes an analyzer 38 configured to analyze the constituent elements based on the fluorescence X-rays, a measuring device 23 configured to measure a height of a surface of the sample exposed from the opening, a determination unit 35 configured to determine whether a height difference between the height measured by the measuring device and a height of an upper surface 11a of the sample stage is within a tolerance, and a notification unit 39 configured to notify a determination result of the determination unit.

According to the above-described configuration, the analyst can recognize the reliability of the analysis result of the constituent elements of the sample S by confirming the determination result.

(Item 2)

In the X-ray fluorescence analyzer as recited in the above-described Item 1, the notification unit notifies a warning indicating that a position of the sample is not appropriate in response to a determination that the height difference is outside the tolerance.

According to the above-described configuration, the analyst can recognize that the reliability of the analysis result decreases when the analysis is started under the current condition by confirming the warning. Thus, the analyst can adjust the position of the sample and avoid the unreliable analysis result from being output.

(Item 3)

In the X-ray fluorescence analyzer as recited in the above-described Item 1 or 2, the notification unit adds information indicating that the height difference is outside the tolerance to an analysis result of the analyzer in response to a determination that the analyzer analyzed the constituent elements in a state in which the height difference is outside the tolerance.

According to the above-described configuration, the analyst can recognize that the analysis result is performed under improper conditions and the reliability of the analysis result is low by checking the information added to the analysis result.

(Item 4)

The X-ray fluorescence analyzer as recited in any one of the above-described Items 1 to 3, further includes a moving mechanism 5 configured to move the sample along the upper surface in response to the determination that the height difference is outside the tolerance.

According to the above-described configuration, even if the sample is improperly placed on the sample stage, the sample can be moved to an appropriate position by moving the moving mechanism. Consequently, it is possible to omit the time and labor for the analyst to adjust the position of the sample.

(Item 5)

In the X-ray fluorescence analyzer as recited in any one of the above-described Items 1 to 4, the measuring device is a laser range finder.

(Item 6)

In the X-ray fluorescence analyzer as recited in any one of the above-described Items 1 to 4, the measuring device includes:

an illumination unit 23c configured to emit illumination light to the opening;
an imaging unit 23d configured to image the opening; and
an image processing unit 23e configured to generate a three-dimensional image from an image obtained by the imaging unit and calculate the height of the surface using the three-dimensional image.

According to the configurations of the fifth or sixth items, it is possible to accurately measure the height of the surface of the sample exposed from the opening.

Embodiments are to be considered in all respects as illustrative and not restrictive. The scope of the present invention is indicated by claims rather than by the above-described embodiments and are intended to include all modifications within the meaning and scope equivalent to claims.

DESCRIPTION OF SYMBOLS

1: Sample chamber
2: Measurement chamber
3, 3A: Computer
4: Housing
5: Moving mechanism
11: Sample stage
11a: Upper surface
11b: Lower surface
12; Opening
21: X-ray source
22: Detector
23: Measuring device
23a: Light-emitter
23b: Light-receiver
23c: Illumination unit
23d: Imaging unit
23e: Image processing unit
24: Support member
30: Processor
31: Memory
32: Storage
33: Input device
34: Display device
35: Determination unit
36: Source control unit
37: Detector controller
38: Analyzer
39: Notification unit
50: Reference horizontal plane
51: Roller
60: Laser beam
70: Recess
80: Drive unit
100, 100A: X-ray fluorescence analyzer
S: Sample
Sa: Surface

The invention claimed is:

1. An X-ray fluorescence analyzer for analyzing constituent elements of a sample, comprising:
a sample stage having an opening, the sample stage being configured to place a sample thereon so that the sample is exposed from the opening;
an X-ray source configured to irradiate the sample with primary X-rays from below the sample stage through the opening;
a detector configured to detect fluorescence X-rays generated from the sample;

an analyzer configured to analyze the constituent elements based on the fluorescence X-rays;

a measuring device configured to measure a height of a surface of the sample exposed from the opening;

a determination unit configured to determine whether a height difference between the height measured by the measuring device and a height of an upper surface of the sample stage is within a tolerance; and a notification unit configured to notify a determination result of the determination unit.

2. The X-ray fluorescence analyzer as recited in claim 1, wherein the notification unit notifies a warning indicating that a position of the sample is not appropriate in response to a determination that the height difference is outside the tolerance.

3. The X-ray fluorescence analyzer as recited in claim 1, wherein the notification unit adds information indicating that the height difference is outside the tolerance to an analysis result of the analyzer in response to a determination that the analyzer analyzed the constituent elements in a state in which the height difference is outside the tolerance.

4. The X-ray fluorescence analyzer as recited in claim 1, further comprising:

a moving mechanism configured to move the sample along the upper surface in response to the determination that the height difference is outside the tolerance.

5. The X-ray fluorescence analyzer as recited in claim 1, wherein the measuring device is a laser range finder.

6. The X-ray fluorescence analyzer as recited in claim 1, wherein the measuring device includes an illumination unit configured to emit illumination light to the opening;

an imaging unit configured to image the opening, and an image processing unit configured to generate a three-dimensional image from an image obtained by the imaging unit and calculate the height of the surface using the three-dimensional image.

* * * * *